US012289280B2

(12) United States Patent
Peterson et al.

(10) Patent No.: US 12,289,280 B2
(45) Date of Patent: Apr. 29, 2025

(54) MESSAGE NOTIFICATION DELAY

(71) Applicant: Lenovo (Singapore) Pte. Ltd., Singapore (SG)

(72) Inventors: Nathan Peterson, Oxford, NC (US); Russell Speight VanBlon, Raleigh, NC (US); Mark Delaney, Raleigh, NC (US); Arnold Weksler, Raleigh, NC (US); John C. Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/821,782

(22) Filed: Aug. 23, 2022

(65) Prior Publication Data

US 2024/0073173 A1  Feb. 29, 2024

(51) Int. Cl.
*H04L 51/224* (2022.01)
*G06F 40/279* (2020.01)
*G06F 40/30* (2020.01)
*H04L 51/212* (2022.01)
*H04L 51/216* (2022.01)

(52) U.S. Cl.
CPC .......... *H04L 51/224* (2022.05); *G06F 40/279* (2020.01); *G06F 40/30* (2020.01); *H04L 51/212* (2022.05); *H04L 51/216* (2022.05)

(58) Field of Classification Search
CPC ... H04L 51/212; H04L 51/216; H04L 51/224; G06F 40/279; G06F 40/30
USPC .......................................................... 709/206
See application file for complete search history.

(56) References Cited

U.S. PATENT DOCUMENTS

| 7,139,817 | B1 | 11/2006 | English et al. | |
| 7,248,865 | B2 | 7/2007 | Imura | |
| 10,674,476 | B1 * | 6/2020 | Baker, Jr. | H04W 4/02 |
| 11,539,647 | B1 * | 12/2022 | Tai | G06F 16/735 |
| 2003/0142125 | A1 | 7/2003 | Salmimaa et al. | |
| 2009/0077617 | A1 * | 3/2009 | Levow | H04L 51/212 726/1 |
| 2009/0089565 | A1 | 4/2009 | Buchanan et al. | |
| 2010/0094710 | A1 * | 4/2010 | Ramakrishna | G06Q 30/0251 709/213 |
| 2011/0244837 | A1 | 10/2011 | Murata et al. | |
| 2013/0085761 | A1 * | 4/2013 | Bringert | H04M 1/724 704/E21.001 |
| 2014/0214973 | A1 * | 7/2014 | DeLuca | H04L 51/226 709/206 |

(Continued)

OTHER PUBLICATIONS

Peterson et al., "Configuring a Device Based On Proximity To Other Devices", file history of related U.S. Appl. No. 13/892,669 now U.S. Pat. No. 9,239,723.

*Primary Examiner* — David P Zarka
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to determine a first context and to determine that a threshold number of messages of a message chain have been received within a threshold amount of time. Based on the first context and the threshold number of messages being received within the threshold amount of time, the instructions are executable to delay presenting at least one notification regarding one or more messages of the message chain.

11 Claims, 7 Drawing Sheets

(56) References Cited

U.S. PATENT DOCUMENTS

| | | | |
|---|---|---|---|
| 2017/0155607 A1* | 6/2017 | Chakra | G06F 40/30 |
| 2017/0286961 A1* | 10/2017 | Robeen | H04W 12/12 |
| 2018/0088969 A1* | 3/2018 | VanBlon | G06F 3/017 |
| 2018/0248829 A1* | 8/2018 | Hardee | H04L 51/214 |
| 2019/0126937 A1* | 5/2019 | Moon | G05D 1/0088 |
| 2019/0332447 A1* | 10/2019 | Kirisken | A63F 13/211 |
| 2021/0019108 A1* | 1/2021 | Smith | H04S 7/304 |
| 2021/0099411 A1* | 4/2021 | Bar-on | H04L 51/18 |
| 2021/0266283 A1* | 8/2021 | Wang | H04L 51/046 |
| 2022/0231981 A1* | 7/2022 | Patel | H04L 51/226 |
| 2022/0272066 A1* | 8/2022 | Choi | H04L 51/224 |
| 2022/0292254 A1* | 9/2022 | Chopdekar | H04L 51/216 |
| 2023/0198929 A1* | 6/2023 | Xu | H04L 51/214 709/206 |
| 2024/0297861 A1* | 9/2024 | Rathi | G06Q 10/107 |
| 2024/0422116 A1* | 12/2024 | Peng | H04L 51/224 |

* cited by examiner

MESSAGE NOTIFICATION DELAY

FIELD

The disclosure below relates to technically inventive, non-routine solutions that are necessarily rooted in computer technology and that produce concrete technical improvements. In particular, the disclosure below relates to message notification delay.

BACKGROUND

As recognized herein, it can be very annoying to get serial notifications as a result of receiving too many text messages. As also recognized herein, this annoyance can be particularly acute when the user's smartphone is playing music or presenting other audio unrelated to the text messages, which gets interrupted by the text message notifications themselves and thus adversely affects the intended functioning of the device. There are currently no adequate solutions to the foregoing computer-related, technological problem.

SUMMARY

Accordingly, in one aspect a first device includes at least one processor and storage accessible to the at least one processor. The storage includes instructions executable by the at least one processor to determine a first context and to determine that a threshold number of messages of a message chain have been received within a threshold amount of time. Based on the first context and the threshold number of messages being received within the threshold amount of time, the instructions are executable to delay presenting at least one notification regarding one or more messages of the message chain.

In various example implementations, the first context may be determined based on a current location of the first device and/or based on communication with a second device different from the first device. The second device may include a vehicle and/or a wearable device.

Also in various example implementations, the threshold number of messages may be greater than one.

Still further, in some example embodiments the instructions may be executable to determine that first and second messages satisfying the threshold number of messages have been received from different senders within the threshold amount of time. In these embodiments, based on the first and second messages being received from different senders within the threshold amount of time, the instructions may be executable to delay presenting the at least one notification regarding one or more messages of the message chain.

Also in some example embodiments, the instructions may be executable to execute natural language processing (NLP) using text identified from one or more messages of the message chain and, based on the NLP, delay presenting at least one notification regarding one or more messages of the message chain.

Additionally, if desired the at least one notification may include an audible notification presented at the first device, a visual notification presented at the first device, an audible notification presented at a second device different from the first device, and/or a visual notification presented at the second device. The second device may include a vehicle and/or a wearable device.

Still further, in some example implementations the instructions may be executable to present the at least one notification responsive to the threshold amount of time ending. In certain specific examples, responsive to the threshold amount of time ending, the instructions may be executable to present no more than a single audible notification and a single visual notification for plural messages of the message chain.

In another aspect, a method includes determining a first context and, based on the first context, delaying presenting at least one notification regarding one or more messages of a message chain.

Thus, in certain examples the message chain may be a first message chain and the method may include determining a first threshold amount of time based on the first context, determining that a first threshold number of messages of the first message chain have been received within the first threshold amount of time, and delaying presenting at least one notification regarding one or more messages of the first message chain based on the first threshold number of messages being received within the first threshold amount of time. Additionally, if desired the method may also include determining a second context different from the first context, determining a second threshold amount of time different from the first threshold amount of time based on the second context, determining that a second threshold number of messages of a second message chain have been received within the second threshold amount of time, and delaying presenting at least one notification regarding one or more messages of the second message chain based on the second threshold number of messages being received within the second threshold amount of time. The second message chain may be the same as the first message chain, and the second threshold number of messages may be the same as the first threshold number of messages or different from the first threshold number of messages.

Additionally, in some examples the first context may be related to driving a vehicle.

Still further, in some examples the method may even include executing natural language processing (NLP) using text identified from one or more messages of the message chain to determine that at least two of the messages from the message chain are related. In these examples, the method may then include delaying presenting at least one notification regarding one or more messages of the message chain based on the determination that at least two messages from the message chain are related.

In still another aspect, at least one computer readable storage medium (CRSM) that is not a transitory signal includes instructions executable by at least one processor to determine a first context and to determine that a threshold number of messages have been received within a threshold amount of time. Based on the first context and the threshold number of messages being received within the threshold amount of time, the instructions are executable to delay presenting at least one notification regarding one or more messages.

Thus, in one example implementation the instructions may be executable to execute natural language processing (NLP) using text identified from one or more messages of a message chain to determine that at least two messages from the message chain are related to a same topic. Based on the determination that at least two of the messages from the message chain are related to the same topic, the instructions may be executable to delay presenting at least one notification regarding one or more messages of the message chain.

Also in an example implementation, the instructions may be executable to, responsive to the threshold amount of time ending, present no more than a single audible notification and a single visual notification for plural messages.

The details of present principles, both as to their structure and operation, can best be understood in reference to the accompanying drawings, in which like reference numerals refer to like parts, and in which:

DETAILED DESCRIPTION

Figure 1:
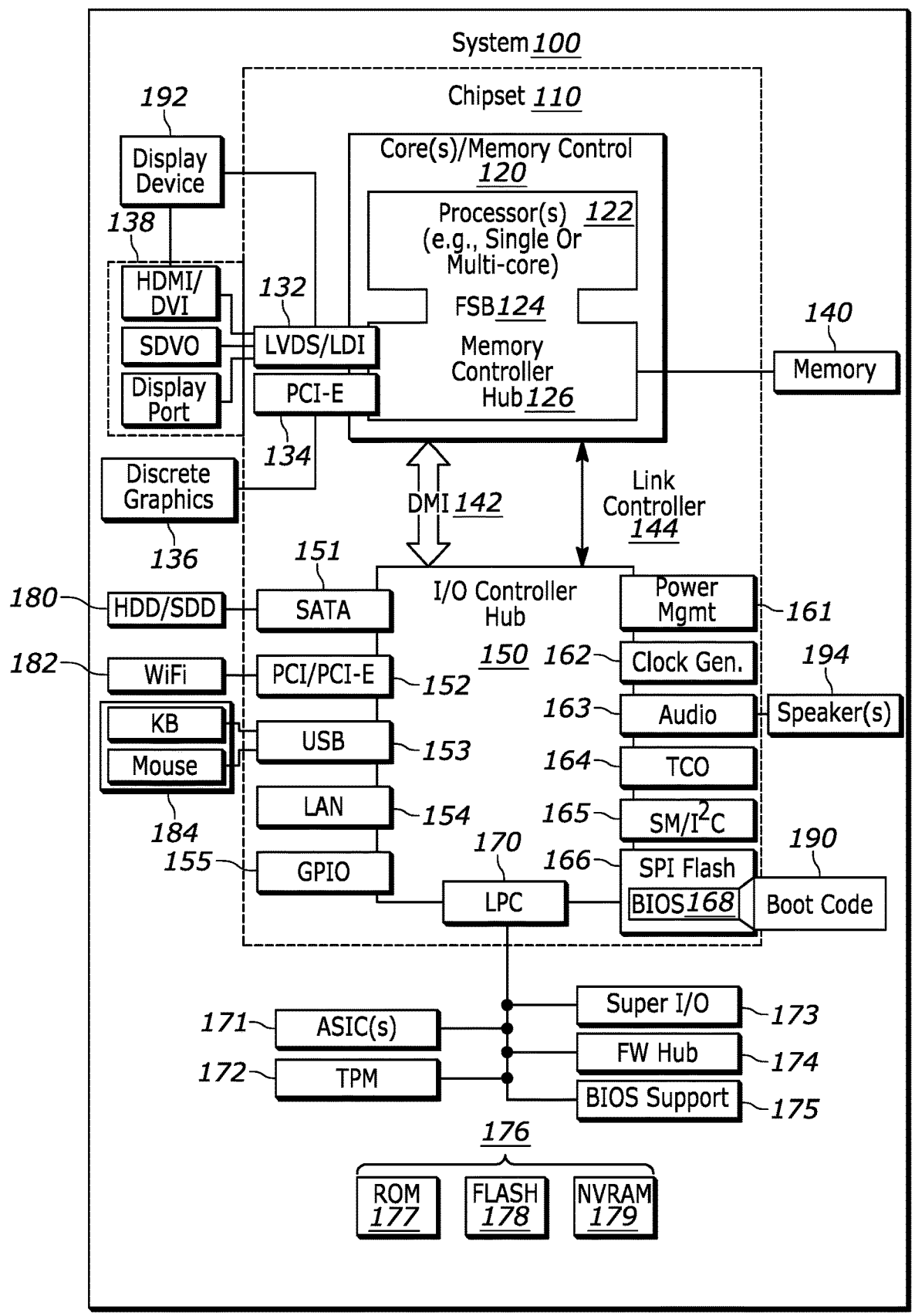
FIG. 1 is a block diagram of an example system consistent with present principles.

Among other things, the detailed description below discusses grouping half thoughts or incomplete thoughts from separate text messages for presentation of a single audible and single visual notification concerning those messages. This may help other audio that is being presented (like music or a podcast) from being repeatedly interrupted by a high volume of text messages, whether the music is being played from a user's smartphone at a vehicle while driving or at a wearable device while the user is jogging/exercising.

Accordingly, present principles may be applied so that message notifications do not have to be shut off altogether (e.g., putting the device in a "do not disturb" mode) since the user may still wish to be informed about certain messages in a somewhat timely fashion notwithstanding the notification delay (e.g., emergency or important messages).

Accordingly, a device operating consistent with present principles may identify the context of the user and/or context of the messages that are being sent to determine when to delay presenting notifications about received messages. For example, if the user is identified as being at home, no message notification delay may be implemented since several message notifications in quick succession may be fine for that user, but if the same person is out with family or driving then the device may implement message notification delay and group notifications together to present a single audible and single visual notification later.

As another example, if the user is out in a crowd like at an outdoor event or concert, the user may be more likely to be preoccupied. Thus, message notification delay may be implemented based on a number of people in proximity to the user.

A device operating consistent with present principles may also determine that a certain person from which one or more messages are received has a tendency to send several messages before that person has received any response from the user. If the message sender is known to do this, then message notification delay may be implemented to filter out message notifications for messages received from that person. Or in other examples, this type of message notification delay may be implemented across the board for all message senders.

Still further, in various examples natural language processing (NLP) may be used to determine if multiple messages are part of the same overall thought/topic of one or more people. If subsequent messages are not part of the same thought as an initial message, the device may decline to implement message notification delay (e.g., based on user preference) and instead present an audible notification and a visual notification about each message immediately responsive to receipt of the respective message itself. However, if the subsequent messages are determined to be part of the same overall thought/topic, then message notification delay may be implemented.

Also note that messages may be grouped based on the amount of time since the last message was received. Thus, notifications about earlier messages may be delayed until some or all subsequent messages have arrived so that a single notification may be provided indicating that new messages have arrived. For example, if the user gets a message from a person named John, the user's device may wait a particular number of seconds or minutes to see if additional messages will come in. At the point the messages stop being received for at least the particular number of seconds or minutes, the device may notify the user that the user has unread messages from John.

What's more, note that the amount of notification grouping/time delay may be based on context. So if the user is driving, the time delay may be longer than when the user is located at home. For example, the time delay for driving may be five or ten minutes without receiving a message, whereas the time delay for being at home may be one minute without receiving a message.

What's more, note that present principles may apply to not just SMS text messages but to other types of messages as well, including instant messages/hangouts messages, video conferencing messages, emails, social media messages (e.g., direct messages), or messages provided through another messaging platform.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chip sets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136.

Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122.

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
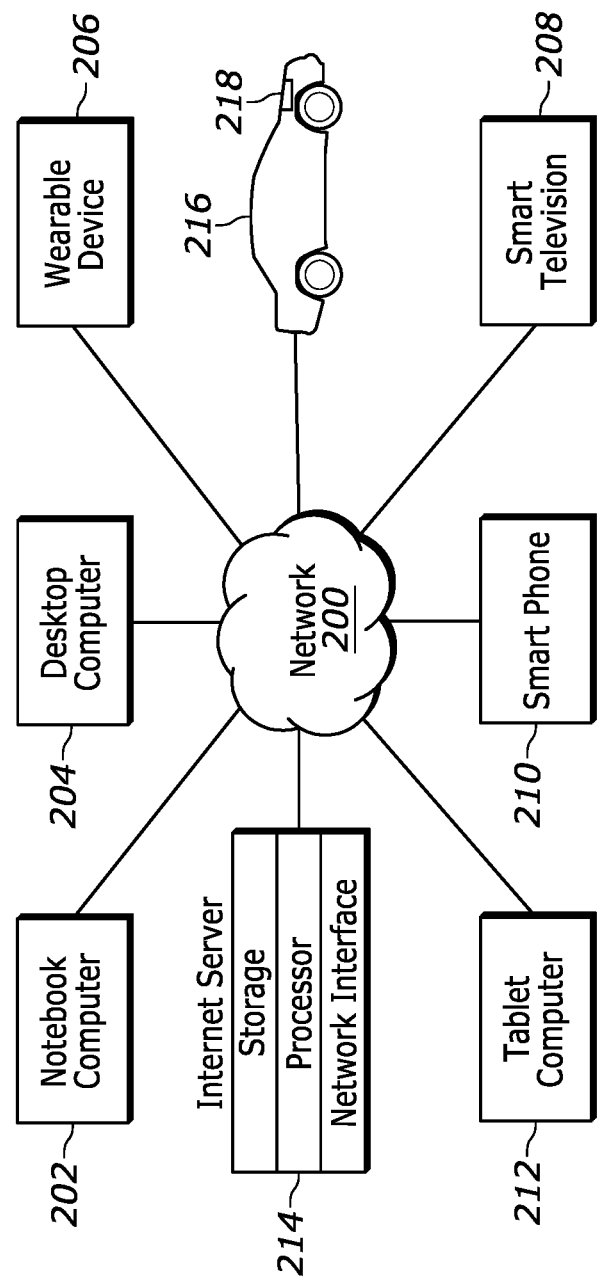
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216 with on-board computer 218, and a server 214 such as an Internet server that may provide cloud storage accessible to the devices 202-212, 216/218. It is to be understood that the devices 202-218 may be configured to communicate with each other over the network 200 to undertake present principles.

Figure 3:
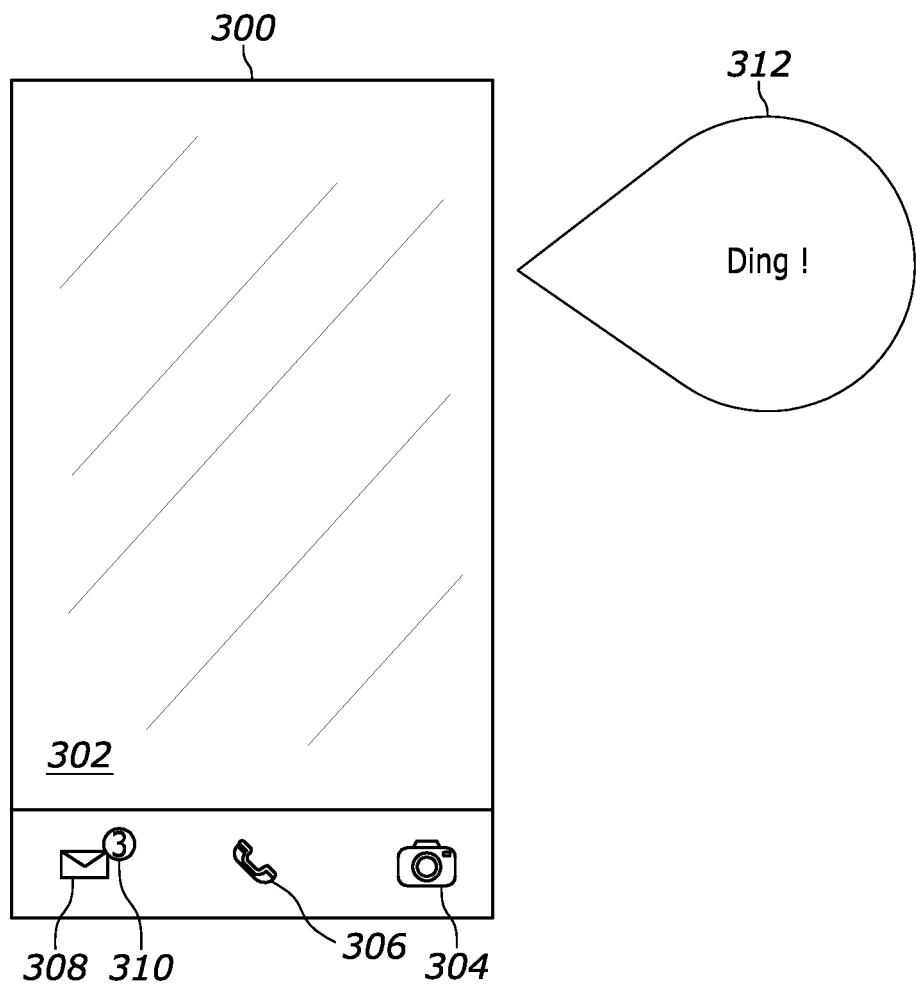
FIGS. 3-5 show various example graphical user interfaces (GUIs) that may be presented on a display to present visual notifications about messages received within a threshold amount of time of each other consistent with present principles.

Now in reference to FIG. 3, suppose a user is driving their vehicle while their smartphone is connected to the vehicle's on-board computer through a pairing process such as Bluetooth pairing. Also suppose the user's smartphone receives a threshold number of short message service (SMS) text messages, multimedia messaging service (MMS) messages, and/or other types of messages within a threshold amount of time of each other. Since having the smartphone provide audible and visual notifications for each respective message that is received may annoy the user and possibly interrupt music or other audio being played through the vehicle's speakers as sourced from the connected smartphone itself, the smartphone may delay presenting any notifications about the messages (or at least delay presenting audible notifications) until the threshold amount of time ends. Then after the threshold amount of time ends, a single audible notification and a single visual notification may be presented for plural messages of the message chain.

Accordingly, as shown in FIG. 3, the smartphone may present a graphical user interface (GUI) 300 on its own display and/or the on-board display of the connected vehicle. The GUI 300 may include visual content 302 such as current track and artist for a song being played through the vehicle's speakers, time of day, and other information. As also shown in FIG. 3, the GUI 300 may also include a camera application ("app") tile 304 that is selectable to launch a camera app for taking a picture via the smartphone, a phone app tile 306 that is selectable to launch a telephone app to place a telephone call, and a text message app tile 308 that is selectable to launch a text message app to view one or more text messages (including those forming the threshold number received within the threshold amount of time).

As further shown in FIG. 3, the text message app tile 308 includes a single visual notification 310 indicating a total number of unread messages of one or more message chains, where the unread messages were received within the threshold amount of time. In the present example, the total number of unread messages is three messages. Additionally, in certain examples, no additional visual notifications for those messages may be presented as part of the GUI 300. For example, additional visual notifications in the form of banner notifications (e.g., temporarily presented toward the top of the display) and persistent notifications presented in the device's notification panel at the top of the display may not be presented for any of the associated text messages.

As also illustrated via FIG. 3, a single audible notification may be presented for the threshold number of messages received within the threshold amount of time, as indicated via the audio bubble 312. The audible notification may be presented via speakers on the smartphone itself and/or speakers on the connected vehicle. Here, a single audible chime or tone is presented (e.g., a single "ding"). Accordingly, in certain examples, no additional audible notifications may be presented besides this single chime or tone. For example, respective audible notifications may not be presented for each unread message of the threshold number, even after the threshold amount of time ends. Instead, the single audible chime or tone is presented for the entire group establishing the threshold number of messages received within the threshold amount of time.

Figure 4:
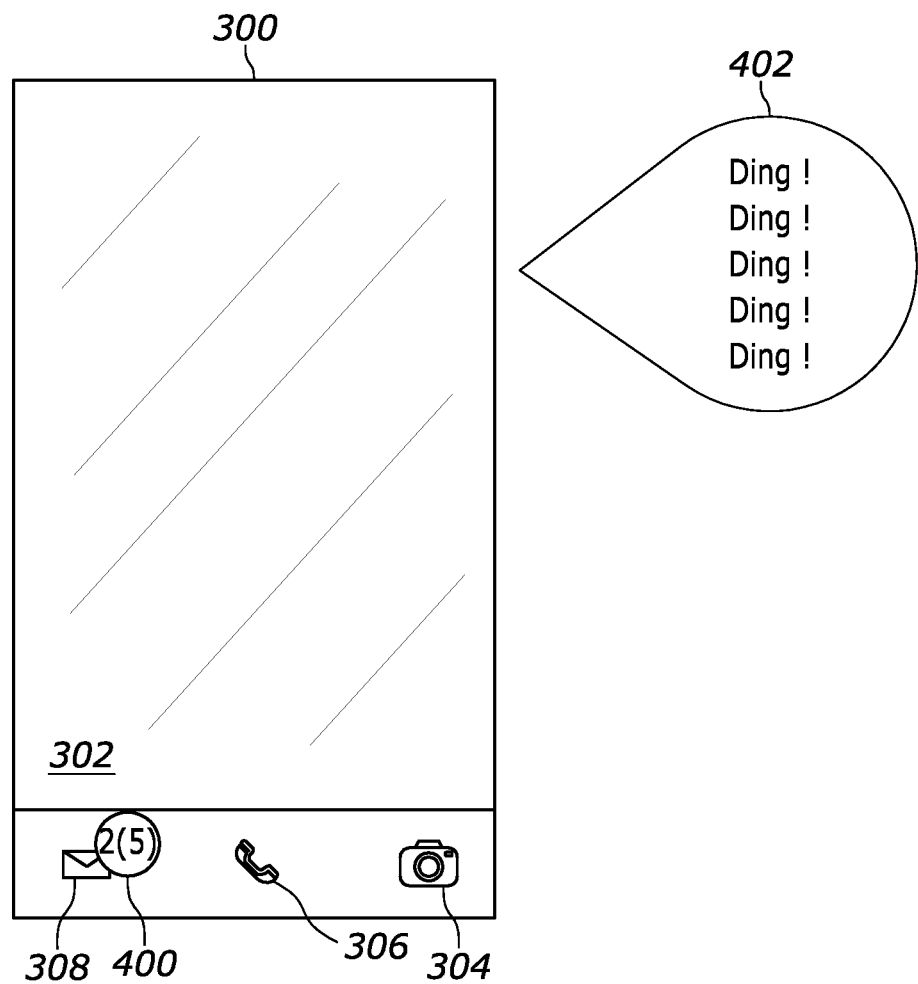

Before moving on to FIG. 4, note that both the threshold number of messages and the threshold amount of time may be set by the smartphone's manufacturer or system administrator, or may even be configured by the end-user themselves. Thus, as an example, the threshold number of messages may be set at two and the threshold amount of time may be set at thirty seconds, such that if two or more messages are received within thirty seconds, the device then may wait until an additional thirty seconds have gone by from the last-received text message before presenting any audible or visual notifications about those messages. Note that this may entail not presenting notifications right away responsive to the first message being received, with the device instead waiting to see if additional text messages are received within the next thirty seconds. Then for each additional message received within the threshold amount of time, the device may reset the timer for the threshold amount of time so that the thirty-second countdown begins again from the time of the last-received text message until no further messages are received within the thirty-second window. Then responsive to that window ending, the notifications 310 and 312 of FIG. 3 may be presented.

Now in reference to FIG. 4, another example is shown. Here again suppose the user is driving their vehicle while their smartphone is connected to the vehicle's on-board computer, and also suppose that the user's smartphone again receives a threshold number of messages within a threshold amount of time. Here again the smartphone may delay presenting any notifications about the messages until the threshold amount of time ends. But FIG. 4 illustrates another example where, after the threshold amount of time ends, plural audible notifications about the messages may be presented along with a different visual notification.

Accordingly, as shown in FIG. 4, the GUI 300 is again presented but here a different example visual notification 400 is presented for the tile 308. The visual notification 400 indicates a first number that corresponds to a total number of separate, discrete message chains for which new messages are unread (two in this example). As also shown in FIG. 4, the visual notification 400 indicates a second number corresponding to a total number of new unread messages from all of the message chains combined (five in this example). Thus, if one message chain contained text messages between the user and first and second additional people, and another message chain contained text messages between the user, the second additional person, and a third additional person, two of the five total unread messages might be included as part of the first message chain and three of the five total unread messages might be included as part of the second message chain.

However, for completeness note that this is but an example and that in other examples the message chains might share no people in common besides the user themselves. Also note that a given message chain might only include the user and one other person in certain examples (e.g., thus not being a group message chain including three or more people total).

As also illustrated via FIG. 4, plural audible notifications may be presented, one for each of the threshold number of messages received within the threshold amount of time (as indicated via the respective tones in audio bubble 402). Again note that these audible notifications may be presented via speakers on the smartphone itself and/or speakers in the connected vehicle. But since these audible notifications may be presented in sequence only after the threshold amount of time ends, they might still only interrupt the user's music once rather than repeatedly as each corresponding message is received.

Figure 5:
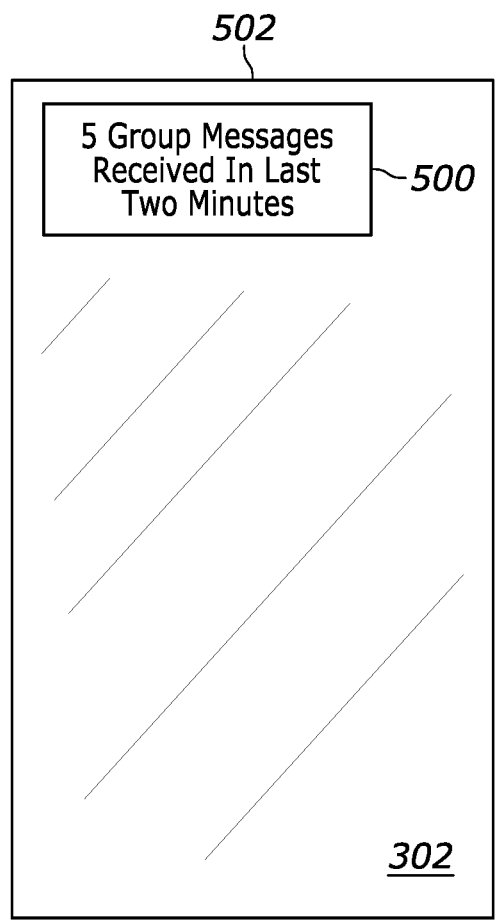

FIG. 5 shows yet another example consistent with present principles. Here again suppose that the user is driving their vehicle while their smartphone is connected to the vehicle's on-board computer, and also suppose the user's smartphone again receives a threshold number of messages within a threshold amount of time of each other. The smartphone may yet again delay presenting any notifications about the messages until the threshold amount of time ends. But FIG. 5 illustrates another example where, after the threshold amount of time ends, a single banner notification 500 about the messages is presented over top of the content 302 (e.g., with the tiles 304-308 possibly not being presented at all).

Thus, in this example the visual content 302 might be presented in full screen mode, or the content 302 might form part of a lock screen 502 or other screen of the smartphone where the tiles 304-308 wouldn't be presented anyway. Note that if the content 302 forms part of the lock screen 502 (at which a passcode is to be provided by the user to unlock the smartphone itself), only the banner notification 500 might be presented and no other new message notifications may be visually presented (e.g., at least until after both the threshold amount of time ends and the user unlocks the smartphone, in which case one of the visual notifications 310 or 400 might be presented). In the present example, the visual notification 500 includes text indicating that five unread messages for one or more group message chains have been received within the last two minutes (which may establish the threshold amount of time in this example). Note here that no audible notifications may be presented responsive to the threshold amount of time ending so as to not annoy the user or interrupt their music or full-screen video, but in other examples one of the audible notifications denoted by bubbles 312 and 402 might be presented.

Figure 6:
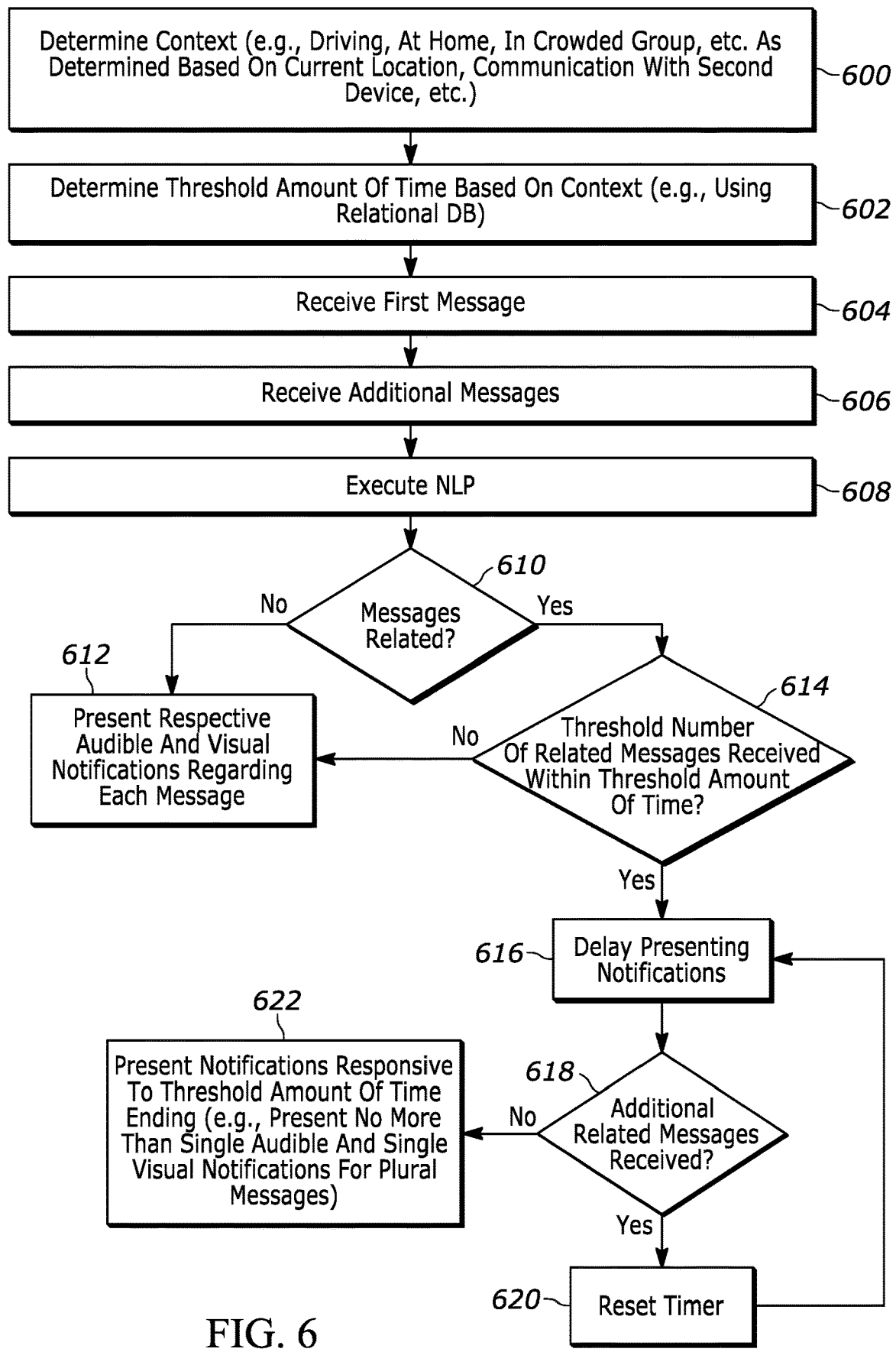
FIG. 6 illustrates example logic in example flow chart format that may be executed by a device consistent with present principles.

Continuing the detailed description in reference to FIG. 6, example logic is shown that may be executed by one or more client devices and/or servers in any appropriate combination consistent with present principles. For example, the logic of FIG. 6 may be executed by an end-user's smartphone alone or in conjunction with a remotely-located Internet server. Also note that while the logic of FIG. 6 is shown in flow chart format, other suitable logic may also be used.

Beginning at block 600, the device may determine at least a first context, such as a context associated with the user themselves. The context might be, for example, that the user is driving a vehicle as determined based on communication with the vehicle's on-board computer to determine the vehicle's transmission has been placed into reverse or drive (or is simply turned on in other examples).

Or as another example, the context may be that the user is at home or that the user is in a crowd (or at least among a threshold number of people). The user being located at their personal residence might be determined based on GPS coordinates from a GPS transceiver on the user's smartphone (e.g., after the user has input their current residence to the smartphone) or from location signals received from another device that indicate location. The user being in a crowd or at least among a threshold number of people may be determined based on communication with additional smartphones or other client devices, such as wearable devices like smart watches or smart glasses that might be in communication with the user's smartphone (e.g., direct one-to-one communication or broadcast communication if the other devices are sending out beacon or device discovery signals). The communications from the other devices might indicate unique user identifications (UUIDs) for each associated person, or even unique media access control (MAC) addresses or other device IDs/wireless signatures, etc. from which the device of FIG. 6 may infer a number of people present. Or in some examples, the device of FIG. 6 might also execute a received signal strength (RSSI) algorithm to determine the strength of the wireless signals from the other devices to then determine a distance of the other devices from the user's device and whether the other devices are within a threshold distance to the user's smartphone to qualify as being proximate to the user. The threshold distance may be configured by the device's manufacturer or configured by the end-user and might be, for example, twenty feet. In any case, further note that the signals themselves may be Bluetooth signals, Wi-Fi signals, or other types of wireless signals.

Other contexts may also be identified at block 600 and it is to therefore be understood that the ones above are examples. For example, the context might be the user exercising as determined from motion signals from motion sensors on the user's smart watch that indicate a predefined exercise activity.

From block 600 the logic may then proceed to block 602. At block 602 the device may determine a first threshold amount of time to use based on the determined context(s). For example, different threshold amounts of time may be applied for different contexts as set by the device manufacturer or end-user. Thus, a relational database may be used for the determination at block 602, where the relational database may indicate various threshold amounts of time for respective contexts. Additionally, if multiple contexts are determined at block 600, the longest duration of the matching threshold amounts of time may be selected at block 602.

From block 602 the logic may then proceed to block 604. At block 604 the device may receive a first message such as a first SMS text message and then move to block 606 where the device may receive additional messages. The logic may then proceed to block 608 in some examples so that the device may execute natural language processing (NLP) using the text of the messages received at blocks 604 and 606, such as executing natural language understanding (NLU), sentiment analysis, and/or topic segmentation and recognition in particular. The text of the messages that are analyzed may include text received as part of a text message as well as text determined through optical character recognition from one or more gifs, images (e.g., photographs), and/or videos included in one or more of the messages. For example, NLP may be executed to determine that a text-only SMS message that mentions a certain topic is related to a gif or video also received in a separate message (in the same chain) that is determined to have the same topic based on the text indicated in the gif or video itself.

Additionally or alternatively, text to be analyzed via NLP may also include text identified from audio included in one or more of the messages received at blocks 604 and 606. For example, voice recognition or other speech-to-text software may be executed on music or a voicemail included in or establishing one of the messages to thus identify corresponding words spoken or sung as part of the audio to then execute NLP on those words as converted to text.

From block 608 the logic may then proceed to decision diamond 610. At diamond 610 the device may determine whether the messages received at blocks 604 and 606 are related based on the execution of NLP using the text identified from the messages (e.g., related in that they concern the same topic as identified via topic segmentation and recognition, and/or concern same sentiment as identified via sentiment analysis). Note here that messages determined to be related may be from the same message chain or from different message chains. For example, if one message chain is a group message chain including the user and at least two other people, and one of the other people texts the user on the side in a separate message chain just between the user and that other person, the device might still determine that the messages from the chain and the side messages are still related even though in two different message chains (e.g., the user and other person are having a side conversation or confidential conversation concerning the same topic that is the subject of the group message chain). Or as another example, the device might determine that an SMS text message received through a text messaging app is related to the same topic as a voicemail message received within the first threshold amount of time but through a voicemail app. Or the device might determine that two voicemails received within the first threshold amount of time are related to the same topic as well.

A negative determination at diamond 610 may cause the logic to proceed to block 612 where the device may present respective audible and/or respective visual notifications for each of the received messages based on the result of the NLP indicating that the messages are not related. However, note in other examples that NLP need not necessarily be executed and that, for example, a threshold number of messages being received within the first threshold amount of time may result in delaying presenting related notifications regardless of whether the messages themselves are related to each other. But assuming an embodiment where NLP is used, also note that an affirmative determination at diamond 610 may cause the logic to proceed to decision diamond 614. At diamond 614 the device may determine whether a threshold number of related messages have been received within the first threshold amount of time determined at block 602. A negative determination at diamond 614 may also cause the logic to proceed to block 612 as described above, while an affirmative determination at diamond 614 may instead cause the logic to proceed to block 616.

At block 616 the device may delay presenting notifications regarding all of the related messages received within the first threshold amount of time (e.g., as received through a single app like a text messaging app, or as received via multiple apps such as a text messaging app and voicemail app or email app). Next the logic may proceed to decision diamond 618.

At diamond 618 the device may determine whether any additional messages are also received within the first threshold amount of time. In embodiments where NLP is being used, at diamond 618 the determination may be a determination of whether any additional messages have been received within the first threshold amount of time that are specifically related to the other messages received during the first threshold amount of time (e.g., same topic).

An affirmative determination at diamond 618 may cause the logic to proceed to block 620 where the device may reset a timer being used to count down the first threshold amount of time and then proceed back to block 616. However, a negative determination at diamond 618 may instead cause the logic to proceed to block 622 where, responsive to the first threshold amount of time ending, the device may present one or more notifications regarding the messages received within the first threshold amount of time. For example, at block 622 the device may, responsive to the first threshold amount of time ending, present no more than a single audible notification and a single visual notification for plural messages of the same message chain or of different message chains (or even different voicemails) that were nonetheless received within the first threshold amount of time. The single audible notification and single visual notification may therefore be presented at the user's smartphone that received the messages themselves, for example, or the single audible notification and single visual notification may be presented at another device in communication with the user's smartphone such as a vehicle or wearable smart watch or headset.

After block 622 the logic may end. Alternatively, the logic may revert back to block 600 to, for example, determine a second context different from the first context, determine a second threshold amount of time different from the first threshold amount of time based on the second context, determine that a second threshold number of messages of a second message chain have been received within the second threshold amount of time, and delay presenting at least one notification regarding one or more messages of the second message chain based on the second threshold number of messages being received within the second threshold amount of time. The second message chain may be the same as or different from the first message chain(s) discussed above in reference to FIG. 6, and the second threshold number of messages may be the same as or different from the first threshold number of messages. For example, different threshold numbers of messages may apply to different contexts based on input from the end-user specifying different threshold numbers to apply for different contexts.

Further note that the logic of FIG. 6 as described above is an example and that other criteria may also be factored into the device determining whether to delay presenting one or more notifications. For example, if the user responds to a message of a certain message chain or otherwise sends a message to other people included in that message chain, the device may discontinue message notification delay for another threshold amount of time so that received message notifications are presented immediately upon the corresponding messages being received since the user is actively engaging in messaging via that message chain and may wish to be informed of new unread messages immediately upon receipt.

As another example, if first and second messages satisfying the threshold number of messages have been received from different senders within the first threshold amount of time, the device may delay presenting the at least one notification regarding one or more messages of that message chain based on the first and second messages being received from different senders within the threshold amount of time. This might help in cases where the user might wish to be immediately informed about new messages from any or all message chains including only one other person, but does not wish to be immediately informed about new messages from a group message chain of three or more people total since messages from a group message chain received in such short order can be particularly annoying.

As yet another example, another criterion for message notification delay may be that the messages received within the relevant threshold amount of time are each from a single person (whether in the same message chain or not) that is determined to be a high-volume message sender. The high-volume threshold may be set by the device manufacturer or end user, for example. Thus, the high-volume threshold might be three or more messages received from the sender within the relevant threshold amount of time in at least two separate messaging instances (possibly also without the user sending an intervening response message to the sender in either instance for that respective instance to qualify toward meeting for the high-volume threshold).

Accordingly, the device may autonomously determine a high-volume message sender based on the high-volume threshold being met for a given sender, and the device may then delay future message notifications for messages from that sender in the future until after the relevant threshold amount of time expires in the future instance (e.g., while continuing to immediately notify the user of other received messages from other senders upon receipt even if also received within the same threshold amount of time). Additionally or alternatively, the end-user themselves might designate certain people as high-volume message senders to which the high-volume threshold might similarly apply.

Figure 7:
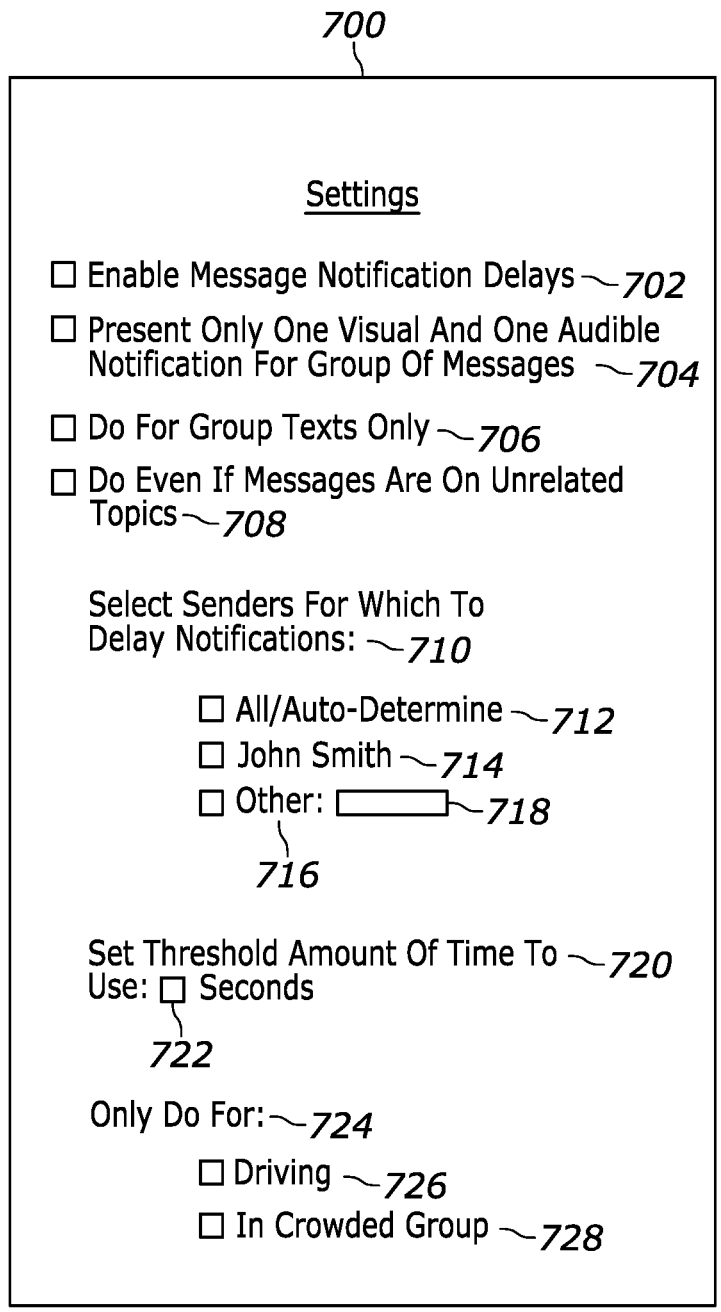
FIG. 7 shows an example settings GUI that may be presented on a display to configure one or more settings of a device to operate consistent with present principles.

Now describing FIG. 7, an example GUI 700 is shown that may be presented on a display of a user's smartphone or other client device at which messages are received and processed consistent with present principles. The settings GUI 700 may be reached by navigating a settings menu of the device itself or a dedicated text messaging app menu, for instance. Also note that in the example shown, each option discussed below may be selected by directing touch or cursor or other input to the respective check box adjacent to the respective option.

As shown in FIG. 7, the GUI 700 may include an option 702 that may be selectable a single time to set or enable the device/system to undertake present principles in multiple future instances. For example, the option 702 may be selected to set or configure the device to execute the logic of FIG. 6 for multiple different contexts at different times, and/or to execute other functions described herein in relation to message notification delay.

The GUI 700 may also include an option 704 that may be selectable to set or configure the device to present only one visual and one audible notification for a group of messages satisfying a threshold number of messages received within a threshold time as described herein. For example, option 704 may be selected to present the audible and visual message notifications described in reference to FIG. 3.

FIG. 7 also shows that the settings GUI 700 may include an option 706 that may be selectable to set or configure the device to delay presenting message notifications only for group message chains that include at least three people (including the user themselves). Still further, the settings GUI 700 may include an option 708 that may be selectable to set or configure the device to delay presenting message notifications for messages satisfying a threshold number of messages and received within a threshold amount of time even if those messages are on topics that are determined via NLP to not be related to each other (e.g., for an even more restrictive message notification delay embodiment).

As also shown in FIG. 7, the GUI 700 may include a setting 710 at which the end-user may select various high-volume message senders for which to delay presenting received message notifications for messages received from those senders. In the example shown, an all and/or autonomously-determine option 712 may be selected. Thus, selection of the option 712 may set the device to delay presenting notifications about messages from all high-volume senders or from particular high-volume senders as autonomously determined by the device consistent with the description above. The setting 710 may also include an option 714 to select a particular person for which to apply this feature as determined from an electronic contacts list to which the device has access, as well as an option 716 at which the end-user may type a particular person or telephone number into input box 718 to indicate application of the high-volume feature to the associated person/telephone number.

The GUI 700 may also include a setting 720 at which a threshold amount of time for the device to use consistent with present principles may be set. Thus, the user may enter numerical input to input box 722 to set the threshold amount of time as a particular number of seconds (or other time increment such as minutes).

Still further, in some examples the GUI 700 may include a setting 724 for the user to select various particular contexts to identify and use for message notification delay consistent with present principles. For example, option 726 may be selected to select driving a vehicle as a context to use, and option 728 may be selected to select the user being in a crowded group as another context to use.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
receive a first message from a first sender;
determine a first context;
determine that, in at least two separate past instances, a threshold number of messages have been received from the first sender within a threshold amount of time without an intervening response being sent to the first sender, the threshold amount of time being tracked using a timer, the threshold number of messages being more than one message; and
based on the first context and based on the determination that, in the at least two separate past instances, the threshold number of messages have been received from the first sender within the threshold amount of time without an intervening response being sent to the first sender, delay presenting at least one notification regarding the first message while continuing to present notifications for other messages received from other senders different from the first sender.

2. The first device of claim 1, wherein the at least one notification regarding the first message comprises one or more of: an audible notification presented at a second device different from the first device, a visual notification presented at the second device.

3. The first device of claim 2, wherein the second device comprises one or more of: a vehicle, a wearable device.

4. The first device of claim 1, wherein the first context comprises a user driving a vehicle, and wherein the instructions are executable by the at least one processor to:
determine a second context, the second context comprising the user being at home; and
based on the second context, present the at least one notification regarding the first message without delaying notification based on context.

5. The first device of claim 1, wherein the instructions are executable to:
receive a second message, the second message being different from the first message;
execute optical character recognition (OCR) on one or more images in the first message to determine that the first message is related to the second message; and
based on the first and second messages being related, delay presenting the at least one notification regarding the first message.

6. A method, comprising:
receiving, at a first device, a first message from a first sender;
determining a first context;
determining that, in at least two separate past instances, a threshold number of messages have been received from the first sender within a threshold amount of time without an intervening response being sent to the first sender, the threshold amount of time being tracked using a timer, the threshold number of messages being more than one message; and
based on the first context and based on the determination that, in the at least two separate past instances, the threshold number of messages have been received from the first sender within the threshold amount of time without an intervening response being sent to the first sender, delaying presenting at least one notification regarding the first message while continuing to present notifications for other messages received from other senders different from the first sender.

7. The method of claim 6, wherein the first context comprises a user driving a vehicle, and wherein the method comprises:
   determining a second context, the second context comprising the user being at home; and
   based on the second context, presenting the at least one notification regarding the first message without delaying notification based on context.

8. The method of claim 6, comprising:
   receiving, at the first device, a second message;
   executing optical character recognition (OCR) on one or more images in the first message to determine that the first message is related to the second message; and
   based on the first and second messages being related, delaying presenting the at least one notification regarding the first message.

9. At least one computer readable storage medium (CRSM) that is not a transitory signal, the at least one CRSM comprising instructions executable by at least one processor to:
   receive a first message from a first sender;
   determine a first context;
   determine that, in at least two separate past instances, a threshold number of messages have been received from the first sender within a threshold amount of time without an intervening response being sent to the first sender, the threshold amount of time being tracked using a timer, the threshold number of messages being more than one message; and
   based on the first context and based on the determination that, in the at least two separate past instances, the threshold number of messages have been received from the first sender within the threshold amount of time without an intervening response being sent to the first sender, delay presenting at least one notification regarding the first message while continuing to present notifications for other messages received from other senders different from the first sender.

10. The CRSM of claim 9, wherein the first context comprises a user driving a vehicle, and wherein the instructions are executable by the at least one processor to:
    determine a second context, the second context comprising the user being at home; and
    based on the second context, present the at least one notification regarding the first message without delaying notification based on context.

11. The at least one CRSM of claim 9, wherein the instructions are executable to:
    receive a second message, the second message being different from the first message;
    execute optical character recognition (OCR) on one or more images in the first message to determine that the first message is related to the second message; and
    based on the first and second messages being related, delay presenting the at least one notification regarding the first message.

* * * * *